(12) United States Patent
Krause et al.

(10) Patent No.: US 6,245,264 B1
(45) Date of Patent: Jun. 12, 2001

(54) METHOD OF PRODUCING AN UPHOLSTERED ARTICLE

(75) Inventors: Markus Krause, Ensdorf; Helmut Storch, Amberg, both of (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/386,781

(22) Filed: Aug. 31, 1999

(30) Foreign Application Priority Data

Sep. 28, 1998 (DE) .............................................. 198 44 373

(51) Int. Cl.[7] .................................................. B29C 44/06
(52) U.S. Cl. .......................... 264/46.4; 29/91.1; 264/261
(58) Field of Search ................................ 264/46.5, 45.1, 264/46.7, 261, 46.4; 29/91.1

(56) References Cited

U.S. PATENT DOCUMENTS

| | | | |
|---|---|---|---|
| 4,738,809 | * | 4/1988 | Storch .................................. 264/46.7 |
| 4,873,036 | * | 10/1989 | Urai ...................................... 264/46.4 |
| 4,908,170 | * | 3/1990 | Kurimoto ............................. 264/46.5 |
| 4,987,666 | * | 1/1991 | Smith ................................... 264/45.1 |
| 4,999,068 | * | 3/1991 | Chiarella .............................. 156/245 |
| 5,177,845 | * | 1/1993 | Meiller et al. ....................... 264/46.7 |
| 5,382,398 | * | 1/1995 | Draxlmaier, Jr. ................... 264/46.5 |
| 5,658,652 | * | 8/1997 | Sellergren ............................ 264/46.5 |
| 5,683,636 | * | 11/1997 | van der Spek et al. ............ 264/46.5 |

FOREIGN PATENT DOCUMENTS

| | | |
|---|---|---|
| 4300375 | 7/1994 | (DE) . |
| 57-182412 | * 11/1982 | (JP) ..................................... 264/46.5 |

* cited by examiner

*Primary Examiner*—Allan R. Kuhns
(74) *Attorney, Agent, or Firm*—Elliot M. Olstein; Raymond J. Lillie

(57) ABSTRACT

In a method of producing an upholstered article, at least first and second cover portions of an upholstery cover are molded in mutually spatially separated relationship. The cover portions are fitted to a core portion to form the upholstery cover therearound. Defined between the outside surface of the core portion and the inside surface of the upholstery cover is a defined gap into which a coating material is introduced. The coating material on hardening joins the upholstery cover to the core portion.

3 Claims, 3 Drawing Sheets

METHOD OF PRODUCING AN UPHOLSTERED ARTICLE

FIELD OF THE INVENTION

The invention generally concerns a method of producing an upholstered article, that is to say for example an article which includes suitable padding for example for comfort-enhancing purposes, such as part of a motor vehicle seat, for example a seat armrest.

BACKGROUND OF THE INVENTION

Various methods are known for the production of upholstered articles. For example, DE 43 00 375 A1 discloses a method of producing an upholstered article comprising a first method step in which a cover for forming the outside component of the article is introduced in a taut and fold-free condition into a deep-drawing mold. Then, in a second step in the method, the cover is foam-backed with a reaction mixture which, after the reaction has taken place, forms a cushion core. A third step in the method then involves the provision of a body which is stable in respect of shape, at the rear side of the cushion core, being the side that is remote from the cover which accordingly forms the outside of the upholstered article. This operation can be effected by casting a hard coating material. Such a method can be carried into effect by employing a mold tool with first and second cover members which are different from each other.

A method of producing an upholstered article can also be effected by means of the use of a mold tool which comprises three different cover members. In such a method, in a first step therein, a skin or surface layer is cast, replacing the above-mentioned cover of the upholstered article. In a second step in this method, a cushion core is produced from a reaction mixture at the rear side or inwardly facing side of the cast skin, this involving the second cover member of the mold tool. In a subsequent third step in the method, a third cover member which replaces the second cover member is then used to produce a body which is stable in respect of shape at the rear side of the cushion core, by virtue of casting a suitable hard coating material.

Consideration may be given at this point to German patent application No 198 33 098 setting forth a method of producing an upholstered article, wherein an upholstery cover is produced by molding, with a hollow space or cavity which is open at one side being defined therein. A core portion is introduced into the cavity in the upholstery cover, the core portion being provided at its surface with raised configurations. The raised configurations of the core portion bear against the inside surface of the cavity of the upholstery cover so that the core portion is held at a defined spacing at all points from the inside surface of the upholstery cover. A coating material is then introduced into the gap determined between the inside surface of the cavity of the upholstery cover and the surface of the core portion, between the upholstery cover and the cushion portion. The coating material introduced into the gap fills the gap and is hardened in the gap, firmly connecting the core portion to the upholstery cover. That method is suitable in particular for the production of upholstered articles without undercut configurations because it would scarcely be possible, or it would be possible only at the cost of considerable complication and expenditure, to introduce a core portion having such undercut configurations into the upholstery cover which is open at one side and which would be correspondingly formed with undercut configurations.

SUMMARY OF THE INVENTION

An object of the present invention is to provide a method of producing an upholstered article with core portion therein, wherein the core portion can readily have at least one undercut configuration and an upholstery cover around the core portion can nonetheless be easily produced and reliably joined to the core portion.

Another object of the present invention is to provide a method of producing an upholstered article which affords a simplified and rational operating procedure with the respective component parts of the upholstered article being produced in positions such as to facilitate manufacture of the article.

Yet another object of the present invention is to provide a method of producing an upholstered article which involves integration of the method steps involved in producing respective components of the article, such as to speed up the operating procedure of the method.

In accordance with the principles of the present invention, the foregoing and other objects are attained by a method of producing an upholstered article wherein at least two cover portions of an upholstery cover of the article are cast or molded in mutually spatially separated relationship. The cover portions are applied to a core portion, forming the upholstery cover thereareound. A defined gap remains between the surface of the core portion and the inside surface of the upholstery cover, and a coating material is introduced for example by pouring into that gap. The coating material fills the gap and hardening thereof connects the core portion to the upholstery cover.

As will be seen from a detailed description of a preferred embodiment of the invention hereinafter, the fact that the upholstery cover is composed of at least first and second cover portions means that it is readily possible for the core portion to involve at least one or a plurality of undercut configurations. The cover portions of the upholstery cover then only have to be designed with suitable peripherally extending separation or end faces in order to be able to fit the cover portions to the core portion which has undercut configurations, in a condition of being suitably adapted to the core portion.

It will be noted that the cover portions of the upholstery cover and the core portion can be produced in mutually separate mold tools or in a common mold tool.

The coating material which is introduced into the defined gap between the core portion and the upholstery cover comprising suitable cover portions and which is hardened in the gap to join the core portion to the upholstery cover enclosing same is preferably a hard coating material. In that way the stability in respect of shape of the upholstered article produced in accordance with the method of the invention is achieved by virtue of the hard coating material in its hardened condition, when for example the core portion itself is not stable in respect of shape. It will be appreciated that it is also possible for the core portion itself also to be stable in respect of shape. In that case, the coating material which fills the gap between the core portion and the upholstery cover therearound, when in the hardened or set condition, can still further increase the level of stability in respect of shape of the article.

In a preferred feature of the invention, the coating material used is a polyurethane (PU)-hard coating material. Such a material is available at inexpensive cost.

A preferred feature of the invention provides that the cover portions of the upholstery cover are provided with connecting members at their end faces which extend at the periphery of the respective cover portions. In that arrangement the coating material penetrates between the end faces of the cover portions and mechanically firmly connects together the cover portions of the upholstery cover, after hardening has occurred, to form the upholstery cover. The connecting members may comprise openings and projections, pins or the like which can be fitted into the openings. That form of the method according to the invention, which involves the use of connecting members between the cover portions, affords the advantage that not only are the cover portions of the upholstery cover mechanically firmly connected to the core portion by means of the coating material, but also the cover portions become a virtually one-piece upholstery cover, along their peripherally extending end faces. That reliably prevents the occurrence of undesired points of separation between the end faces of the cover portions, without involving a complicated structure or operating procedure.

In accordance with another preferred feature of the invention the cover portions of the upholstery cover and/or the core portion can have raised parts for establishing the defined gap. As normally the core portion has a suitable level of stability in respect of shape, in comparison with the upholstery cover, it is desirable in particular for the core portion to be formed with raised parts defining the gap.

In a preferred feature of the invention the cover portions of the upholstery cover are cast or molded from a reaction foam material. It is advantageous to use a PU-integral foam material for that purpose. In combination with a PU-hard coating material between the cushion core portion and the upholstery cover, this use of a PU-integral foam material affords homogeneity in terms of the kinds of material used, and that can be an advantageous factor from the points of view of recycling and environmental protection.

In accordance with another preferred feature of the invention the core portion can be cast or molded from a reaction foam material. The core portion however may also comprise any other suitable material such as wood, polystyrene and the like. If the core portion is produced from a reaction foam material, it is preferable to use a PU-molding material in order also to ensure the above-mentioned homogeneity in terms of kinds of material used, in regard to the core portion of the upholstered article produced by the method in accordance with the invention.

Mechanical stability or stability in respect of shape of the upholstered article produced by the method of the invention can be still further enhanced by the core portion being formed with passage means extending therethrough. Those passage means are then filled by the coating material which fills and sets in the gap between the core portion and the upholstery cover.

Further objects, features and advantages of the present invention will be apparent from the following description of a preferred embodiment thereof.

DESCRIPTION OF THE PREFERRED EMBODIMENT

It will firstly be noted that the same features and components are indicated by the same respective references in each of FIGS. 1 through 5.

Figure 1:
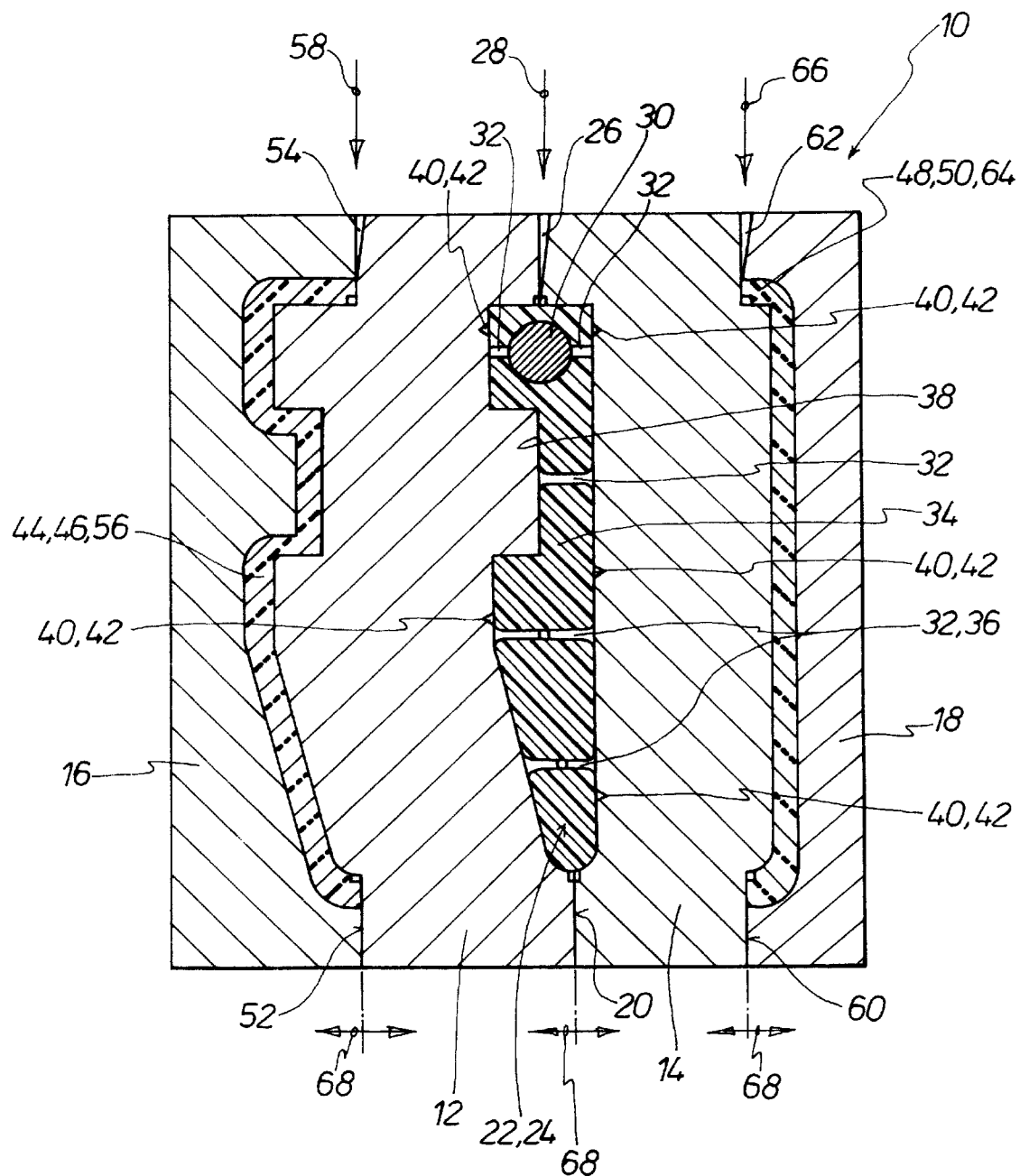
FIG. 1 is a sectional view of a mold tool for carrying out a method for producing an upholstered article having a core portion with an undercut configuration therein.

Referring therefore now firstly to FIG. 1, FIG. 1 is a sectional view showing a mold tool indicated generally at 10, comprising a first central portion 12, a second central portion 14, a first cover portion 16 which is disposed on the side of the first central portion 12 remote from the second central portion 14, and a second cover portion 18 disposed on the side of the second central portion 14 remote from the first central portion 12. In the closed condition of the mold tool 10, the first and second central portions 12 and 14 bear against each other in sealing relationship at faces on a first separation plane indicated at 20. The first and second central portions 12 and 14 define between them a first mold cavity 22 for molding a core portion 24 of an upholstered article. An ingate 26 opens into the first mold cavity 22. A reaction foam material is cast into the first mold cavity 22 through the ingate 26, as indicated by the arrow 28. The reaction foam material for constituting the core portion 24 produced in the first mold cavity 22 is preferably a PU-material which fills the first mold cavity 22 after reaction of the PU-material has taken place.

Reference numeral 30 in FIG. 1 denotes for example a bar or like member which extends through the first mold cavity 22. Such a member 30 may be used when the upholstered article to be produced is for example a component such as a vehicle seat armrest. The first central portion 12 and/or the second central portion 14 are also provided with limbs or webs 32 which form through passages 36 in the core portion 24 comprising the reaction foam material 34, after the mold tool 10 is opened. The core portion 24 is of a configuration involving a generally undercut portion as indicated at 38 in FIG. 1. In that case for example as illustrated the first central portion 12 of the mold tool 10 is of a corresponding configuration at the surface thereof which defines the adjacent surface of the core portion 24. The first and second central portions 12 and 14 are also provided in the region of the first mold cavity 22 with a plurality of recesses 40 disposed at spacings in the inwardly facing surfaces of the first and second central portions 12 and 14. The recesses 40 serve to form on the molded core portion 24 raised parts which are also indicated at 42 in FIG. 1, formed from the reaction foam material 34 introduced into the mold cavity 22 for forming the core portion 24.

In the closed condition of the mold tool 10, the first central portion 12 and the first cover portion 16 define between them a mold cavity 44 for a first cover portion 46 of the upholstered article to be produced by the method according to the invention. Similarly, in the closed condition of the mold tool 10, the second central portion 14 and the second cover portion 18 define between them a mold cavity 48 for a second cover portion 50. The first central portion 12 and the first cover portion 16 bear sealingly against each other along a second separating plane 52, when the mold tool 10 is in the closed condition. An ingate 54 opens into the mold cavity 44 for producing the first cover portion 46. A reaction foam material 56 is introduced into the mold cavity 44 through the ingate 54 when the mold tool 10 is in the closed condition. The reaction foam material 56 is preferably a PU-integral foam material. The introduction of such material into the mold cavity 44 through the ingate 54 is indicated by the diagrammatic arrow 58.

In the closed condition of the mold tool 10 the second central portion 14 and the second cover portion 18 bear sealingly against each other along a common third separating plane 60 in order to define between them the mold cavity 48 for the second cover portion 50. An ingate 62 opens into the mold cavity 48 for the introduction into the mold cavity 48 of a reaction foam material 64, as diagrammatically indicated by an arrow 66. This last-mentioned reaction foam material 64 is preferably a PU-reaction foam material like the reaction foam material 56 for the first cover portion 46.

After the core portion 24 and the two cover portions 46 and 50 have been produced by molding in their respective mold cavities, the mold tool 10 is opened along the separating planes 20, 52 and 60 by virtue of suitable relative movement of the mold portions 12, 14, 16 and 18. This is indicated diagrammatically by the double-headed arrows 68 in FIG. 1. After the mold tool 10 has been opened, the core portion 24 and the cover portions 46 and 50 can be appropriately removed.

Thereupon, the cover portions 46 and 50 are fitted around the core portion 24. In that case, the cover portions 46 and 50 enclose the core portion 24 on all sides to constitute an upholstery cover which is generally indicated at 70 in FIG. 2. The way in which the cover portions 46 and 50 enclose the core portion 24 to constitute an upholstery cover around same can be clearly seen from FIGS. 2, 3 and 4 showing the upholstered article in the assembled condition.

Figures 2, 4:
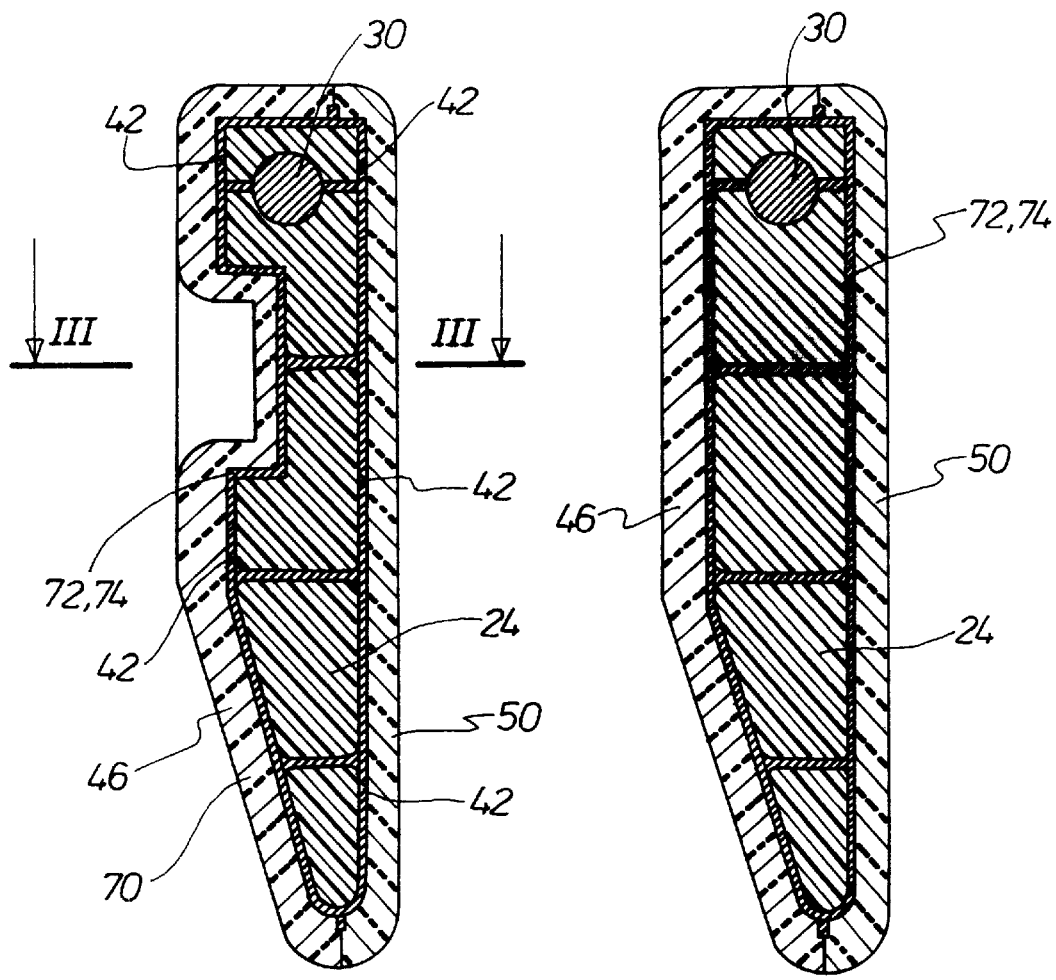
FIG. 2 is a sectional view of an upholstered article, the individual parts of which are produced by the mold tool shown in FIG. 1, with the sectional plane in FIG. 2 corresponding to that in FIG. 1.
FIG. 4 is a view in section taken along line IV—IV in FIG. 3.
Figure 3:
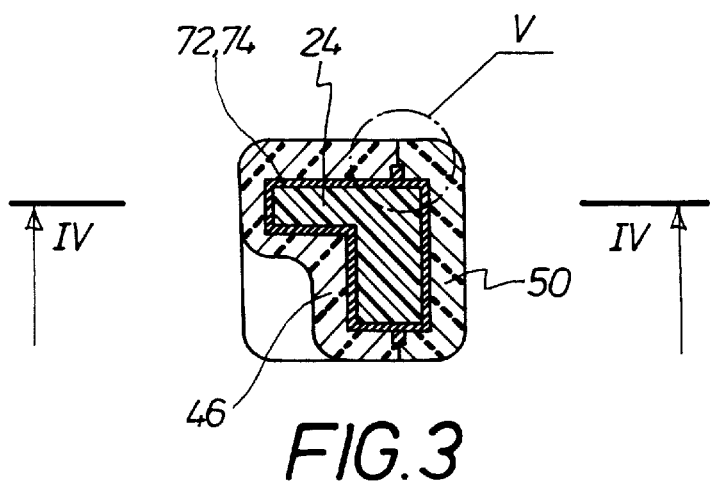
FIG. 3 is a view in section taken along section line III—III in FIG. 2.

When the cover portions 46 and 50 are in their positions of being fitted to the cover portion 24, the raised parts 42 which project from the outside surface of the core portion 24 define a gap which is indicated at 72 in FIGS. 2 through 4, between the core portion 24 and the cover portions 46 and 50. A coating material indicated generally at 74 is then introduced into the gap 72, for example by being poured or cast therein. The coating material which is preferably a hard coating material such as a PU-hard coating material completely fills up the gap 72 and connects the core portion 24 to the upholstery cover 70 formed by the cover portions 46 and 50, when the coating material 74 hardens in the gap 72.

Figure 5:
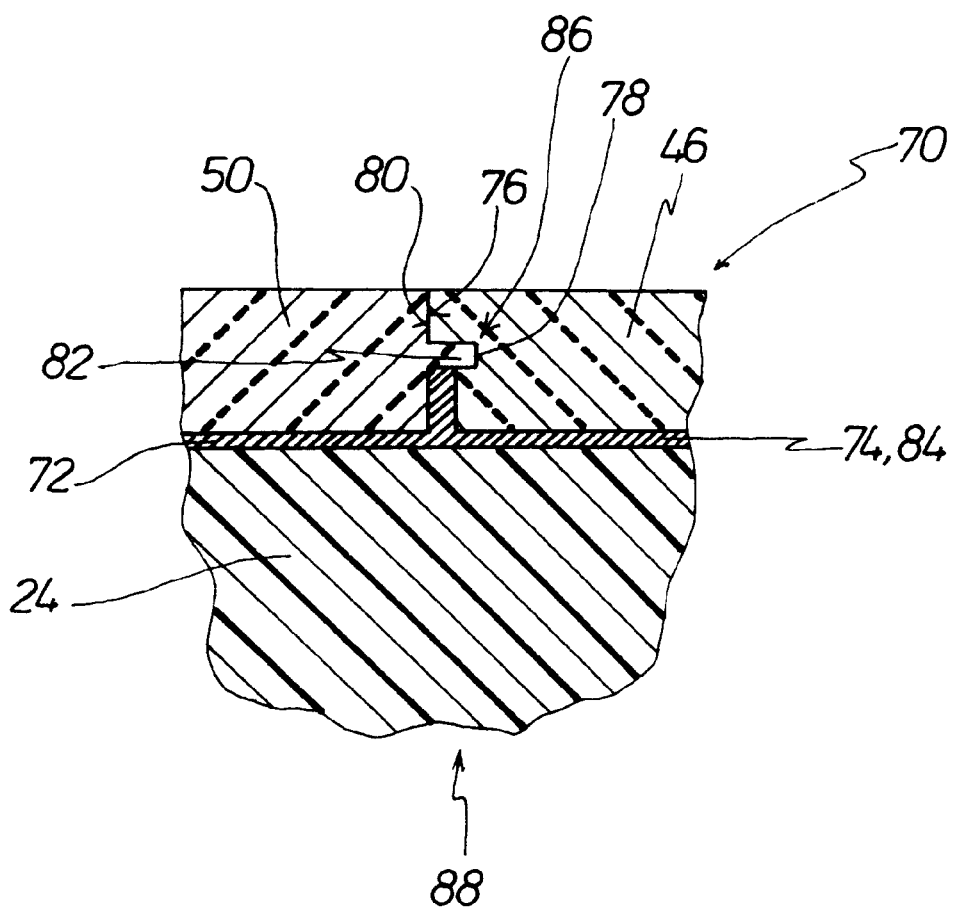
FIG. 5 is a view on an enlarged scale of the detail indicated at V in FIG. 3.

Reference will now be made to FIG. 5 showing that the first cover portion 46, at its peripherally extending end face 76, is formed with openings 78 of which only one is visible in FIG. 5. In a corresponding manner, the peripherally extending end face 80 of the second cover portion 50 is formed with projections or pin portions 82 which are matched in terms of shape to the openings 78. The openings 78 and the projections 82 thus constitute connecting means for joining the cover portions 46 and 50 together. The coating material 74 can penetrate between the adjacent end faces of the cover portions 46 and 50 and mechanically firmly connect them together after the coating material 74 has set and hardened.

For that purpose, on the side that is towards the gap 72, the peripherally extending end face 76 and the peripherally extending end face 80 of the first and second cover portions 46 and 50 respectively are spaced from each other in such a way that a peripherally extending gap 84 is formed between them. The gap 84 is in communication with the gap 72 between the core portion 74 and the upholstery cover 70 formed from the cover portions 46 and 50. Consequently, like the gap 72 between the core portion 24 and the upholstery cover 70, the above-mentioned gap 84 is filled with the coating material 74 so that, in the hardened condition, the cover portions 46 and 50 are firmly connected together along the end faces 76 and 80 to constitute the upholstery cover 70 enclosing the core portion 74. It will be seen that reference 86 in FIG. 5 denotes the connecting configuration afforded by the co-operation of the openings 78 and the projections 82 for connecting the cover portions 46 and 50 together.

It will be appreciated that the above-described embodiment of the method according to the invention has been set forth solely by way of example and illustration of the principles of the invention and that various other modifications and alterations may be made therein without thereby departing from the spirit and scope of the invention.

What is claimed is:

1. A method of producing an upholstered article, comprising:

molding at least first and second cover portions of an upholstery cover in mutually spatially separated relationship, wherein said cover portions of said upholstery cover are molded from a reaction foam material, producing a core portion, applying the cover portions to the core portion in a relationship such that the cover portions form the upholstery cover around the core portion, wherein a defined gap remains between the surface of the core portion and the inside surface of the upholstery cover, and introducing a coating material into said gap to fill said gap, thereby setting said coating material and joining the core portion and the upholstery cover together.

2. A method of producing an upholstered article, comprising:

molding at least first and second cover portions of an upholstery cover in mutually spatially separated relationship, producing a core portion, said core portion having a passage means extending therethrough, applying the cover portions to the core portion in a relationship such that the cover portions form the upholstery cover around the core portion, wherein a defined gap remains between the surface of the core portion and the inside surface of the upholstery cover, and introducing a coating material into said gap to fill said gap, thereby setting said coating material and joining the core portion and the upholstery cover together.

3. A method of producing an upholstered article, comprising:

molding from a PU-integral foam material at least first and second cover portions of an upholstery cover in mutually spatially separated relationship;

producing a core portion;

applying the cover portions to the core portion in a relationship such that the cover portions form the upholstery cover around the core portion, wherein a defined gap remains between the surface of the core portion and the inside surface of the upholstery cover; and introducing a coating material into said gap to fill said gap, and setting said coating material joining the core portion and upholstery cover together.

* * * * *